United States Patent [19]

Kita et al.

[11] Patent Number: 5,691,084
[45] Date of Patent: Nov. 25, 1997

[54] ORGANIC ELECTROLYTIC SOLUTION SECONDARY CELL

[75] Inventors: Fusaji Kita; Masaharu Higashiguchi, both of Suita; Kouji Murakami, Ibaraki; Akira Kawakami, Takatsuki, all of Japan

[73] Assignee: Hitachi Maxell, Ltd, Osaka, Japan

[21] Appl. No.: 553,666

[22] PCT Filed: Mar. 17, 1995

[86] PCT No.: PCT/JP95/00464

§ 371 Date: Nov. 17, 1995

§ 102(e) Date: Nov. 17, 1995

[87] PCT Pub. No.: WO95/26057

PCT Pub. Date: Sep. 28, 1995

[30] Foreign Application Priority Data

Mar. 19, 1994 [JP] Japan ................... 6-074320
Aug. 15, 1994 [JP] Japan ................... 6-214219

[51] Int. Cl.$^6$ ................................ H01M 6/14
[52] U.S. Cl. ................. 429/194; 429/218; 429/197; 429/203
[58] Field of Search ................... 429/194, 197, 429/203, 218

[56] References Cited

U.S. PATENT DOCUMENTS 4,668,595  5/1987  Yoshino et al. .................... 429/194
5,455,127  10/1995  Olsen et al. ....................... 429/194

FOREIGN PATENT DOCUMENTS 0517669  6/1987  Japan .

OTHER PUBLICATIONS

"Summaries of Lectures in Autumn Meeting of Electrochemistry in 1991"; Electrochemical Society; p. 132 (with abstract), no month available.

*Primary Examiner*—Bruce F. Bell
*Attorney, Agent, or Firm*—Birch, Stewart, Kolasch & Birch, LLP

[57] ABSTRACT

An organic electrolytic solution secondary cell having a positive electrode, a negative electrode and an organic electrolytic solution, wherein a solvent of the organic electrolytic solution contains a triester of phosphoric acid, and the negative electrode contains a carbonaceous material, further, the carbonaceous material of the negative electrode has the specific surface condition, and carbon dioxide is dissolved in the organic electrolytic solution, whereby safety and shelf stability of the cell are increased, and also cell properties such as the closed circuit voltage, the retention (difference between the charge capacity and the discharge capacity), the discharge capacity and so on are improved.

9 Claims, 1 Drawing Sheet

ORGANIC ELECTROLYTIC SOLUTION SECONDARY CELL

FIELD OF THE INVENTION

This application is a 371 of PCT/JP95/00464 filed Mar. 17, 1995.

The present invention relates to an organic electrolytic solution secondary cell. In particular, the present invention relates to a secondary cell comprising an organic electrolytic solution which has improved safety and shelf stability.

DESCRIPTION OF THE RELATED ART

An organic electrolyte solution secondary cell is a secondary cell in which an organic solvent is used as a solvent of an electrolytic solution. Such type of the secondary cell is increasingly used, since it has a large capacity, generates a high voltage and has a high energy density.

In such secondary cell, as a solvent of the electrolytic solution, an organic solvent such as 1,2-dimethoxyethane and propylene carbonate has been used. But, since 1,2-dimethoxyethane is included in the Dangerous Object, Class 4, list and has a low flash point so that it has large danger to ignite, in these days, the use of such solvent is undesirable in view of the safety from fire.

An ester of phosphoric acid is a desirable solvent for the organic electrolytic solution secondary cell, since it is incombustible or nonflammable (a flush point of above 100° C.).

But, when lithium or its alloy is used as a negative electrode in relation to a positive electrode active material such as manganese oxide together with the electrolytic solution comprising the phosphoric acid ester, lithium in the negative electrode reacts with the solvent to increase an internal resistance greatly, whereby the cell properties are deteriorated and then the shelf stability is worsened.

SUMMARY OF THE INVENTION

An object of the present invention is to provide an organic electrolytic solution secondary cell which solves the problems of the above conventional organic electrolytic solution secondary cell, has the improved safety and shelf stability, and is excellent in the cell properties.

According to the present invention, there is provided an organic electrolytic solution secondary cell comprising a positive electrode, a negative electrode and an organic electrolytic solution, wherein a solvent of said organic electrolytic solution contains a triester of phosphoric acid, and said negative electrode comprises a carbonaceous material.

In one preferred embodiment, a ratio of a peak intensity of carbon around 285 eV ($I_{285}$) to a sum of peak intensities of carbon from around 284 eV to around 289 eV ($I_c$) ($I_{285}/I_c$) in an X-ray photoelectron spectroscopy on a surface of the negative electrode is not larger than 1.0.

In another preferred embodiment, a ratio of a peak intensity of phosphorus around 135 eV ($I_{135}$) to a sum of peak intensities of carbon from around 284 eV to around 289 eV ($I_c$) ($I_{135}/I_c$) in an X-ray photoelectron spectroscopy on a surface of the negative electrode is at least 0.05, and this ratio on the surface is larger than a $I_{135}/I_c$ ratio of an inside of the negative electrode.

In another preferred embodiment, carbon dioxide is dissolved in the organic electrolytic solution.

The organic electrolytic solution secondary cell of the present invention is excellent in the cell properties such as a closed circuit voltage, a retention (a difference between a charge capacity and a discharge capacity), a discharge capacity, and so on.

DETAILED DESCRIPTION OF THE INVENTION

Figure 1:
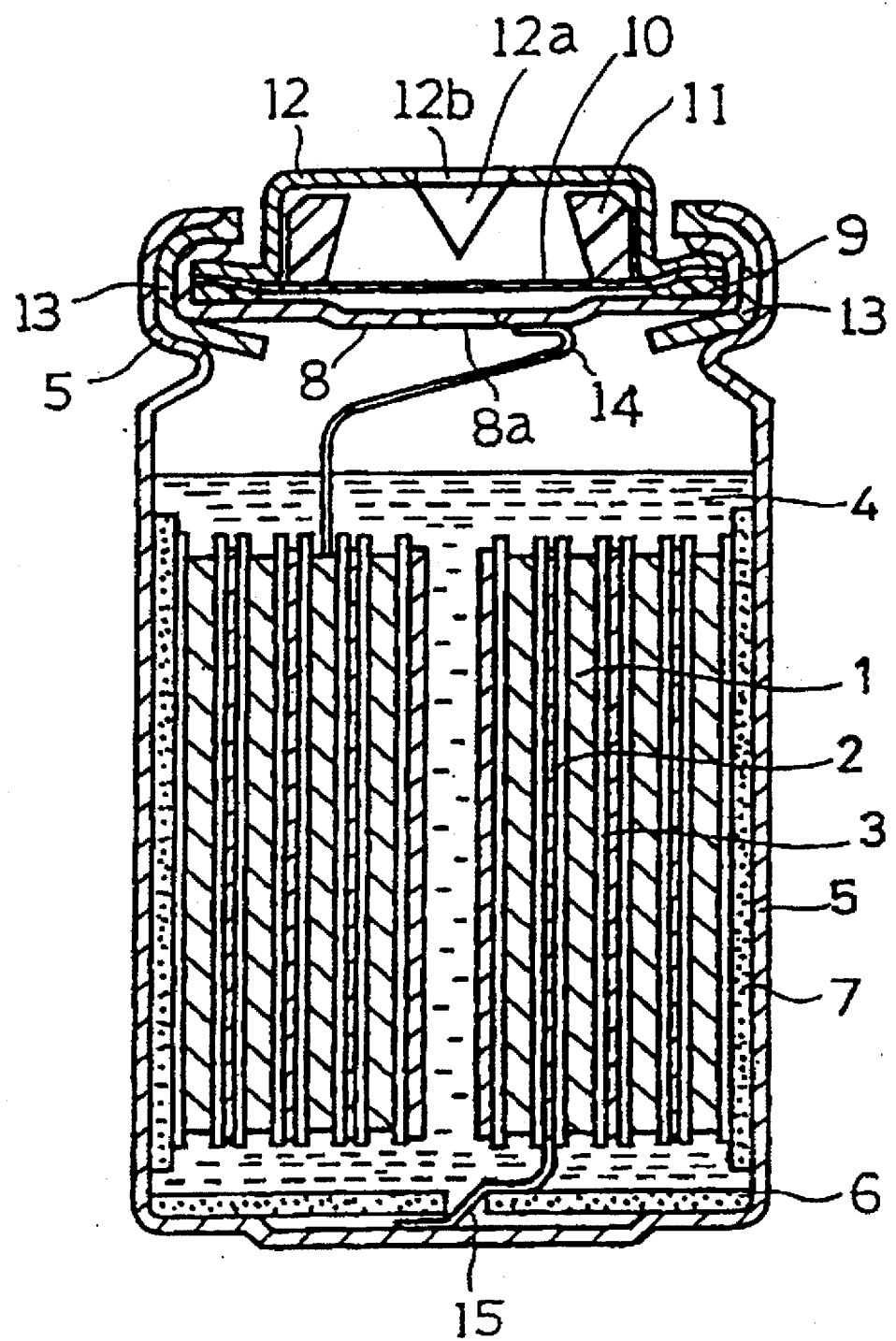
FIG. 1 is a vertical cross sectional view of an example of the organic electrolytic solution secondary cell according to the present invention.

In the present invention, the triester of phosphoric acid is a compound of the formula:

$$(R'O)_3P=O \qquad (I)$$

wherein three R' groups are the same or different and represent a monovalent organic hydrocarbon group. A preferred example of the triester is a compound of the formula (I) in which R' is an alkyl group having 1 to 6 carbon atoms, that is, a trialkyl phosphate.

Hereinafter, the present invention will be explained by making reference to a cell using a trialkyl phosphate as a solvent of the organic electrolytic solution, but the scope of the present invention is not limited by such embodiment.

A negative electrode to be used in the present invention is produced by molding a mixture comprising a carbonaceous material as a conductive material, a binder and so on, around a core of a current collector member such as a copper foil.

As the carbonaceous material, any carbonaceous material that can be doped or dedoped by lithium ions may be used. For example, graphite, pyrolytic carbon materials, coke, glassy carbons, sintered materials of organic polymers, mesocarbon microbeads, carbon fiber, activated carbon, and so on can be used.

One of the preferred examples of the carbonaceous material is prepared by carbonizing a heavy oil, coal tar, pitch base fibers, etc. and finely grinding them. That is, when such raw material is heated, as the temperature rises, aromatic rings are formed to provide a condensed polynuclei aromatic ring structure. The product is further heated to a temperature of 700° C. or higher till a part of the structure is converted to a quasigraphite structure, and pulverized and dried to obtain a precursor of a negative electrode active material.

Preferably, this precursor has a (002) plane spacing of at least 3.3 Å, more preferably at least 3.35 Å, most preferably at least 3.36 Å. An upper limit of this plane spacing is 3.5 Å or less, preferably 3.45 Å, or less, more preferably 3.4 Å or less.

A size of a crystallite in the c-axis direction is preferably at least 30 Å, more preferably at least 80 Å, most preferably at least 250 Å, and its upper limit is preferably 1000 Å or less, more preferably 500 Å or less.

An average particle size of the precursor is preferably from 8 to 15 μm, in particular, from 10 to 13 μm, and a purity is preferably at least 99.9%.

The use of such precursor of the negative electrode active material improves the shelf stability of the organic electrolytic solution secondary cell comprising the trialkyl phosphate as the solvent of the electrolytic solution, and suppresses the increase of the internal resistance with time, whereby the excellent cell properties are attained. To further improve the cell properties, it is preferred to treat the surface of the precursor of the negative electrode active material or the negative electrode produced therefrom.

The surface treatment may be carried out by dipping the above precursor or the negative electrode in a carbon treatment solution containing an alkali metal ion to dope the alkali metal ion therein, or heat treating it in an atmosphere containing a small amount of lithium atoms, and oxygen atoms or phosphorus atoms. The desired surface condition may be achieved by adjusting a composition of the atmosphere in which the above carbonaceous material is synthesized, without carrying out the above further treatment.

Here, an example of treating the negative electrode using the precursor thereof in the carbon treatment solution will be explained.

A concentration of an electrolyte in the carbon treatment solution is not limited. Preferably, as the carbon treatment solution, there is used a solution prepared by dissolving a metal salt in an organic solvent in a concentration of 0.01 to 4 mole/l, in particular from 0.5 to 1.5 mole/l. When carbon dioxide is dissolved in the carbon treatment solution, a negative electrode in which the reactivity between the negative electrode surface and the electrolytic solution is suppressed is preferably formed.

As the solvent of the treatment solution, a mixed solvent of a trialkyl phosphate and an ester having a large dielectric constant of, for example, at least 30 is preferably used. Examples of the trialkyl phosphate are trimethyl phosphate, triethyl phosphate, tributyl phosphate, etc. Examples of the ester having the large dielectric constant are ethylene carbonate, propylene carbonate, butylene carbonate, γ-butyrolactone, etc.

Examples of the electrolyte in the treatment solution are $LiClO_4$, $LiPF_6$, $LiBF_4$, $LiAsF_6$, $LiSbF_6$, $LiCF_3SO_3$, $LiCF_3CO_2$, $Li_2C_2F_4-(SO_3)_2$, $LiN(CF_3SO_2)_2$, $LiC(CF_3SO_2)_3$, $LiC_nF_{2n+1}SO_3$ ($n \geq 2$), and so on.

When such surface treatment is applied, the number of carbon-hydrogen bonds (C—H) which are present on the surface of the precursor of the negative electrode active material is decreased, while the number of functional groups such as $C^*-OR^1$, $C^*(=O)-OR^1$, $C^*-(OR^1)(OR^2)$ and $C^*=O$ wherein $C^*$ indicates a carbon atom on the surface of the carbonaceous material, $R^1$ and $R^2$ are each a hydrogen atom, an alkyl group having 1 to 10 carbon atoms or an alkali metal atom increases. As the result, the ratio of a peak intensity of carbon around 285 eV ($I_{285}$) to a sum of peak intensities of carbon from around 284 eV to around 289 eV ($I_c$) ($I_{285}/I_c$) in an X-ray photoelectron spectroscopy (XPS) on the surface of the negative electrode is decreased to 1.0 or less, preferably 0.5 or less, more preferably 0.1 or less. Thereby, the reactivity between the surface of the negative electrode and the electrolytic solution is further decreased, so that the shelf stability is further improved, and the high closed circuit voltage is obtained.

When the treatment solution contains a phosphorus compound such as the trialkyl phosphate, an amount of phosphorus atoms on the surface of the negative electrode increases. A the result, the ratio of a peak intensity of phosphorus around 135 eV ($I_{135}$) to a sum of peak intensities from around 284 eV to around 289 eV ($I_c$) ($I_{135}/I_c$) in an X-ray photoelectron spectroscopy on the surface of the negative electrode becomes at least 0.05, preferably at least 0.1, more preferably at least 0.2, and is larger than that of the inside of the negative electrode. Thereby, the retention (a difference between the charge capacity and the discharge capacity) is decreased in addition to the improvement of the shelf stability.

A ratio of the $I_{135}/I_c$ on the surface of the negative electrode to that of an inside part of the negative electrode which appears after etching the negative electrode by argon sputtering of 7 to 8 μA for 10 minutes is 1:0.95 or less, preferably 1:0.9 or less, more preferably 1:0.7 or less.

The positive electrode to be used in the present invention may be produced by molding a positive electrode active material such as a metal oxide (e.g. manganese oxide; vanadium pentoxide, chromium oxide, lithium nickel oxide ($LiNiO_2$, etc.), lithium cobalt oxide ($LiCoO_2$, etc.), lithium manganese oxide ($LiMn_2O_4$, etc.), and so on), metal sulfides (e.g. titanium disulfide, molybdenum disulfide, and so on) or a mixture of such positive electrode active material and an electric conducting aid and a binder (e.g. polytetrafluoroethylene, etc.) around a core of a current collector such as a stainless steel net.

In the present invention, the electrolytic solution is prepared by dissolving an electrolyte in the organic solvent.

As the organic solvent, the ester of phosphoric acid of the formula (I), in particular, a trialkyl phosphate of the formula:

$$(RO)_3P=O \qquad (I)$$

wherein the three R groups are the same or different and represent an alkyl group having 1 to 6 carbon atom, for example, trimethyl phosphate, triethyl phosphate, tripropyl phosphate, tributyl phosphate, and the like is mainly used.

That is, in the present invention, a major part of the solvent of the electrolytic solution is the ester of phosphoric acid. This means that the whole solvent consists of the trialkyl phos phate or the solvent comprises at least 40 vol. %, preferably at least 60 vol. %, more preferably at least 90 vol. % of the trialkyl phosphate, and less than 40 vol. % of other solvent.

When the volume of the trialkyl phosphate is increased, the properties of the trialkyl phosphate, namely, incombustibility or nonflammability are well utilized, so that the safety of the cell from the fire is further improved. On the other hand, in view of the discharge property, it is preferred to use other solvents together with the trialkyl phosphate in a percentage such that the safety of the cell from the fire based on the trialkyl phosphate is maintained.

Preferably, other solvent is an ester having a dielectric constant of at least 30, more preferably at least 50 (except the ester of phosphoric acid). When such ester is used, the nonflammable electrolytic solution in which the solubility of the electrolyte is high can be obtained. In addition, the number of the reaction active sites between the surface of the carbonaceous negative electrode and the electrolytic solution is decreased. That is, when the trialkyl phosphate and the ester having the high dielectric constant are used in combination, the solubility of the electrolyte in the solvent is improved, the conductivity is increased, and the capacity of the cell is also increased. In particular, when the carbonaceous material having a crystallite size in the c-axis direction Lc of at least 30 Å, preferably at least 80 Å, particularly at least 250 Å is used, the capacity is significantly increased.

As the ester having the high dielectric constant, an alkylene carbonate having 2 to 10 carbon atoms, in particular, 2 to 6 carbon atoms is preferably used. Examples of the alkylene carbonate are ethylene carbonate, propylene carbonate, butylene carbonate, γ-butyrolactone, ethylene glycol sulfite, etc. Among them, one having a cyclic structure is preferred, and in particular, a cyclic carbonate is preferred. The most preferred ester is ethylene carbonate, which has a dielectric constant of 95.

Since the ester having the high dielectric constant is combustible, its amount to be used in combination with the ester of phosphoric acid is preferably small in view of the safety. A content of the ester having the high dielectric constant in the electrolytic solution is preferably 10 vol. % or less, more preferably 5 vol. % or less, most preferably 3 vol. % or less of the volume of all the solvents. The increase of the cell capacity by the ester having the high dielectric constant appears when the content of the ester having the high dielectric constant is at least 1 vol. % of the volume of all the solvents in the dielectric solution. When this content reaches 2 vol. % or higher, the cell capacity is greatly increased. Then, when the ester having the dielectric constant is used in combination with the trialkyl phosphate, its content is from 1 to 10 vol. %, preferably from 2 to 5 vol. %, in particular from 2 to 3 vol. % of the volume of all the solvents in the electrolytic solution.

In addition, a difference of a boiling point between the trialkyl phosphate and the ester having the high dielectric constant is preferably 150° C. or less, more preferably 100° C. or less, most preferably 50° C. or less, in particular 10° C. or less. This is because the ester tends to be less ignited when the combustible ester and the nonflammable trialkyl phosphate are azeotropically evaporated.

In addition to the ester having the high dielectric constant, 1,2-dimethoxysilane, 1,3-dioxolane, tetrahydrofuran, 2-methyltetrahydrofuran, diethyl ether and so on may be used as a further solvent of the electrolyte. Furthermore, an amineimide organic solvent or a sulfur- or fluorine-containing organic solvent may be used. Preferably, a content of such further solvent is 10 vol. % or less of the volume of all the solvent in the electrolytic solution.

As the electrolyte in the electrolytic solution, there is used $LiClO_4$, $LiPF_6$, $LiBF_4$, $LiAsF_6$, $LiSbF_6$, $LiCF_3SO_3$, $LiC_4F_9SO_3$, $LiCF_3CO_2$, $Li_2C_2F_4(SO_3)_2$, $LiN(CF_3SO_2)_2$, $LiC(CF_3SO_2)_3$, $LiC_nF_{2n+1}SO_3$ ($n \geq 2$), and mixtures thereof. Among them, $LiPF_6$ and $LiC_4F_9SO_3$ are preferably used, since they have good charge-discharge properties. A concentration of the electrolyte in the electrolytic solution is not limited. Usually, the concentration is from 0.1 to 2 mole/l, preferably from 0.4 to 1 mole/l.

In the present invention, when carbon dioxide is dissolved in the organic electrolytic solution, the cell capacity is further increased. A reason for this may be as follows:

When the carbonaceous material is used in the negative electrode, the reaction between the carbonaceous material and the solvent of the electrolytic solution will takes place, and a reaction product tends to interfere the charge-discharge reaction, or decrease the capacity.

A function of carbon dioxide has not been clarified but may be assumed as follows:

When carbon dioxide is dissolved in the organic electrolytic solution, a thin composite film of, for example, an organic or inorganic carbonate or phosphate salt may be formed on the surface of the carbonaceous material. This composite film may suppress the reaction between the carbonaceous material and the solvent of the electrolytic solution. Further, the composite film may have no adverse effect on the charge-discharge reaction and may not induce the decrease of the capacity, whereby the maximum abilities of the positive electrode material and the negative electrode material can be derived, and the cell capacity can be increased.

The dissolution of carbon dioxide is more effective, when a lithium composite oxide which has a closed circuit voltage of 4 V or higher in relation to Li during charging, for example, $LiNiO_2$, $LiCoO_2$, $LiMn_2O_4$ or their composite is used as the positive electrode active material. Such positive electrode active material generates a high voltage and will oxidize the electrolytic solution to decrease a discharge property of the electrolytic solution. When carbon dioxide having good oxidation resistance is added to the electrolytic solution, it suppresses decomposition of the electrolytic solution due to oxidation on the surface of the positive electrode. In particular, $LiNiO_2$ which is one of the composite oxides comprising Ni is difficult to use in the cell, since it has a higher reactivity with the electrolytic solution than other metal oxides. The dissolution of carbon oxide can suppress the reaction of $LiNiO_2$ with the organic electrolytic solution, whereby the large capacity of the cell is attained.

An amount of carbon dioxide to be dissolved in the organic electrolytic solution is at least 0.03 mole/l (at least 0.03 mole of carbon dioxide per one liter of the electrolytic solution), preferably at least 0.1 mole/l, more preferably at least 0.3 mole/l, in relation to the organic electrolytic solution in the cell.

The amount of carbon dioxide is increased, the reaction activity of the carbonaceous material is stably derived, and the reactivity of the positive electrode active material with the organic electrolytic solution is suppressed. When the amount of carbon dioxide is too large, it will evaporate from the organic electrolytic solution to increase an internal pressure of the cell, whereby the cell may burst. Then, the amount of carbon dioxide is preferably 2 mole/l or less, in view of pressure resistance of a cell case and a sealing member of an opening of the cell case.

An amount of carbon dioxide which is contained in the cell but is not dissolved in the organic electrolytic solution will be dissolved in the organic electrolytic solution when carbon dioxide in the solution is consumed or when the temperature is lowered, it is regarded as "being dissolved" substantially.

To dissolve carbon dioxide in the organic electrolytic solution, carbon dioxide is bubbled through the organic electrolytic solution, or liquid carbon dioxide is dissolved in the organic electrolytic solution. During bubbling, the higher pressure of carbon dioxide is more preferred. Alternatively, the organic electrolytic solution and carbon dioxide are charged in a closed pressure vessel and pressurized to dissolve carbon dioxide in the organic electrolytic solution, or a piece of dry ice is placed in the cell case and then the opening of the cell case is sealed.

When carbon dioxide is dissolved, a partial pressure of carbon dioxide is preferably at least 0.5 $kgf/cm^2$, more preferably at least 1.0 $kgf/cm^2$.

The organic electrolytic solution is supplied in the cell case preferably in a dry atmosphere containing carbon dioxide.

Temperature of the electrolytic solution to be supplied or that of the cell before the charge of the electrolytic solution is preferably 10° C. or lower, in particular −20° C. or lower. The use of dry ice or liquid carbon dioxide can achieve such temperature easily. It is preferred to lower the temperature by placing a piece of dry ice in the cell. In this case, the piece of dry ice is not dipped in the organic electrolytic solution but is preferably placed on a separator and so on. The opening of the cell case is sealed within one minute, preferably within 20 seconds, more preferably within 10 seconds from the placement of the piece of dry ice.

To supply the organic electrolytic solution containing dissolved carbon dioxide in the cell case, for example, the cell case and the organic electrolytic solution are cooled to a temperature of −20° C. or lower for several hours, and the cooled organic electrolytic solution is poured in the cooled cell case. Alternatively, the cell case is set in a centrifugal separator and then the organic electrolytic solution is quickly supplied, or the cell case is evacuated, and then the organic electrolytic solution is supplied.

In general, the organic electrolytic solution secondary cell of the present invention can be assembled by placing the above positive electrode and the negative electrode comprising the carbonaceous material with facing each other through a separator interposed therebetween, and pouring the organic electrolytic solution comprising the trialkyl phosphate as the main solvent in which carbon dioxide is preferably dissolved.

A type of the cell may be a cylinder, a button, a coin and so on.

EXAMPLES

The present invention will be illustrated more in detail by the following Examples. The present invention is not limited to the following Examples.

Example 1

$LiC_4F_9SO_3$ (hereinafter referred to as "NFB") was dissolved in trimethyl phosphate, and then propylene carbonate (hereinafter referred to as "PC") was added to the solution and mixed to prepare an organic electrolytic solution comprising NFB dissolved in a concentration of 0.6 mole/l in a mixed solvent of PC and trimethyl phosphate in a volume ratio of 1:2.

Lithium cobalt oxide ($LiCoO_2$) (91 wt. parts), graphite (6 wt. parts) and polyvinylidene fluoride as a binder (3 wt. parts) were mixed to prepare a positive electrode mixture, which was dispersed in N-methylpyrrolidone to obtain a slurry. The slurry of the positive electrode mixture was coated uniformly on both surfaces of an aluminum foil having a thickness of 20 μm as a positive electrode current collector and dried, followed by press molding by a roller press. Then, a lead wire was welded to the current collector to produce a band-form positive electrode.

Separately, coke having a (002) plane spacing $d_{002}$ of 3.43 Å (90 wt. parts) and polyvinylidene fluoride as a binder (3 wt. parts) were mixed to obtain a negative electrode mixture, which was dispersed in N-methylpyrrolidone to obtain a slurry. The slurry of the negative electrode mixture was coated uniformly on both surfaces of a copper foil having a thickness of 20 μm as a negative electrode current collector and dried, followed by press molding by a roller press. Then, a lead wire was welded to the current collector to produce a band-form positive electrode precursor.

Then, a liquid for treating the negative electrode precursor was prepared. That is, NFB was dissolved in trimethyl phosphate, and ethylene carbonate (hereinafter referred to as "EC") was added to the solution and mixed to prepare a treating solution comprising NFB dissolved in a concentration of 0.6 mole/l in a mixed solvent of EC and trimethyl phosphate in a volume ratio of 1:1.

The negative electrode precursor was sandwiched by a pair of Li foils to which respective lead members were press fitted with interposing a separator consisting of a polypropylene film in which the above treating liquid was impregnated, and inserted in a holder made of polypropylene. Then, the composite of the negative electrode precursor and the Li foils was discharged with the negative electrode precursor being a positive electrode and the Li foils being negative electrodes at 300 mA to 0 V for 250 mAh per one gram of the carbonaceous material in the electrode, and then charged at 300 mA up to 1.5 V. Thereafter, the composite was disassembled, and the negative electrode precursor was washed with dimethyl carbonate and dried to produce a negative electrode.

Then, the band-form positive electrode was laminated on the sheet-form negative-electrode with interposing a microporous polypropylene film having a thickness of 25 μm therebetween, and the laminated positive electrode and negative electrode were spirally wound to form a spiral electrode body, which was inserted in a cell case having a cylinder form with a bottom and an outer diameter of 15 mm. After welding lead wires for the positive and negative electrodes, the above prepared organic electrolytic solution was filled in the cell case. Thereafter the opening of the cell case was sealed, and the cell was precharged to obtain a cylindrical organic electrolytic solution secondary cell.

FIG. 1 shows a cross sectional view of art example of the cell according to the present invention, which comprises a positive electrode 1, a negative electrode 2, a separator 3, an organic electrolytic solution 4, a cell case 5, an insulator 6, a sealing plate 8, a terminal plate 12, an insulating packing 13, and lead wires 14 and 15. To make the drawing simple, current collectors are not shown in FIG. 1.

The cell case 5 is made of, for example, stainless steel and also functions as a negative electrode terminal. On the bottom of the cell case 5, the insulator 6 made of, for example, a polytetrafluoroethylene sheet is provided. The cell case 5 contains all the main elements of the cell, for example, the spiral electrode body consisting of the positive electrode 1, the negative electrode 2 and the separator 3, the organic electrolytic solution 4, and so on. Around the spiral electrode body, there is provided an insulator 7 comprising, for example, a polytetrafluoroethylene sheet.

The sealing plate 8 which is made of, for example, stainless steel has a gas vent hole 8a at its center, and also an annular packing 9 made of, for example, polypropylene, a flexible thin plate 10 made of, for example, titanium and a thermally deformable annular member 11 made of, for example, polypropylene. A pressure for breaking the flexible thin plate 10 can be changed by the deformation of the thermally deformable member 11 caused by temperature change.

The terminal plate 12 is made of, for example, a rolled steel plate which is plated by nickel, and has a cutting edge 12a and a gas vent hole 12b. When a gas is generated in the cell and the internal pressure increases, the flexible thin plate 10 is deformed by the increased internal pressure and broken by the cutting edge 12a. Then, the gas in the cell is exhausted outside through the hole 12b, whereby the breakage of the cell is prevented.

The lead member 14 electrically connects the positive electrode 1 and the sealing plate 8, and the terminal plate 12 functions as the positive electrode terminal since it contacts to the sealing plate 8. The lead member 15 electrically connects the negative electrode 2 and the cell case 5.

Example 2

In the same manner as in Example 1 except that the quantity of discharged electricity was changed to 210 mAh per one gram of the carbonaceous material in the treatment of the negative electrode precursor, a cylindrical organic electrolytic solution secondary cell was produced.

Example 3

In the same manner as in Example 1 except that the quantity of discharged electricity was changed to 50 mAh per one gram of the carbonaceous material in the treatment of the negative electrode precursor, a cylindrical organic electrolytic solution secondary cell was produced.

Example 4

In the same manner as in Example 1 except that the negative electrode precursor as such was used as the negative electrode without the treatment, a cylindrical organic electrolytic solution secondary cell was produced.

Comparative Example 1

In the same manner as in Example 1 except that a metal lithium plate was used as the negative electrode, a cylindrical organic electrolytic solution secondary cell was produced.

With each of the cylindrical organic electrolytic solution secondary cells produced in Examples 1–4 and Comparative Example 1, a change rate of the internal resistance before and after the storage was measured by the following procedure. Further, after the storage test, a closed circuit voltage of the cell (a minimum discharge voltage when a constant current of 0.3 A was applied for 10 msec.) was measured. The results are shown in Table 1.

Change of internal resistance

After a cell is charged at 0.1 C up to 4.1 V, it is stored at 80° C. for 10 days, and a change of impedance at 1 KHz is measured. A change rate is calculated according to the following equation to evaluate the deterioration of the cell properties:

Change rate of internal resistance=Impedance of a cell after storage ($\Omega$)/Impedance of a cell before storage ($\Omega$).

For reference, Table 1 contains the $I_{285}/I_c$ ratio of the carbonaceous material of the negative electrode in each Examples, which is obtained by carrying out the XPS analysis on the surface of the negative electrode and calculating a ratio of a peak intensities of carbon around 285 eV ($I_{285}$) to a sum of peak intensities of carbon from around 284 eV to around 289 eV ($I_c$) ($I_{285}/I_c$).

TABLE 1

| Ex. No. | Closed circuit voltage after storage (V) | Change rate of internal resistance | $I_{285}/I_c$ |
|---------|------------------------------------------|------------------------------------|---------------|
| Ex. 1   | 3.92                                     | 1.2                                | 0.05          |
| Ex. 2   | 3.80                                     | 1.3                                | 0.17          |
| Ex. 3   | 3.67                                     | 1.3                                | 0.6           |
| Ex. 4   | 3.23                                     | 1.4                                | 5.0           |
| C. Ex. 1| <0.00                                    | 10.8                               | —             |

As seen from the results in Table 1, with the organic electrolytic solution secondary cell of Comparative Example 1, the internal resistance after storage was about eleven times larger than the original internal resistance, while with each of the organic electrolytic solution secondary cells of Examples 1–4, the increase of the internal resistance was only about 20 to 40%, and the closed circuit voltage was high.

Each of the organic electrolytic solution secondary cells of Examples 1–4 was overdischarged to −4 V with the maximum current of 4 A. All the cells were not ignited, and were excellent in safety.

Example 5

NFB was dissolved in trimethyl-phosphate, and then EC was added to the solution and mixed to prepare a solution comprising NFB dissolved in a concentration of 0.5 mole/l in a mixed solvent of EC and trimethyl phosphate in a volume ratio of 1:2. Further, carbon dioxide was bubbled through the solution for 10 minutes to dissolve carbon dioxide at a partial pressure of 1 kgf/cm$^2$ in the solution, which was used as a carbon treatment solution. A dissolved amount of carbon dioxide in the solution was 0.1 mole/l.

For the preparation of a precursor of a negative electrode active material, carbon having a (002) plane spacing $d_{002}$ of 3.43 Å, a crystallite size in the c-axis direction Lc of 32 Å, an average particle size of 12 µm, a purity of 99% and a Si content of 10 ppm (90 wt. parts) and polyvinylidene fluoride as a binder (10 wt. parts) were mixed to obtain a mixture, which was dispersed in N-methylpyrrolidone to obtain a slurry.

The slurry of the negative electrode mixture was coated uniformly on both surfaces of a copper foil having a thickness of 18 µm as a negative electrode current collector and dried, followed by press molding by a roller press. Then, a lead wire was welded to the current collector to produce a band-form electrode precursor. This electrode precursor was doped with lithium by forming a short circuit between this electrode and a lithium electrode as a counter electrode in the above carbon-treatment solution for 48 hours, and then dedoped by the application of a voltage of 1.5 V (against Li/Li+) for 3 days, followed by vacuum drying, to obtain a band-form negative electrode.

A retention was evaluated using a model cell comprising this negative electrode and a solution of 0.5 mole/l of NFB/EC: trimethyl phosphate (volume ratio of 1:2), that is, a solution comprising NFB dissolved in a concentration of 0.5 mole/l in the mixed solvent of EC and trimethyl phosphate in a volume ratio of 1:2, which was bubbled by carbon dioxide as above for 10 minutes (dissolved amount of carbon dioxide being 0.1 mole/l) as an electrolytic solution. In the first cycle, the retention of the negative electrode was only 1.8%.

Separately, LiCoO$_2$ (91 wt. parts), graphite (6 wt. parts) and polyvinylidene fluoride as a binder (3 wt. parts) were mixed to prepare a mixture, which was dispersed in N-methylpyrrolidone to obtain a slurry. The slurry of the positive electrode mixture was coated uniformly on both surfaces of an aluminum foil having a thickness of 20 µm as a positive electrode current collector and dried, followed by press molding by a roller press. Then, a lead wire was welded to the current collector to produce a band-form positive electrode.

Then, on this positive electrode, the above negative electrode was laminated with interposing a microporous polypropylene film having a thickness of 25 µm therebetween, and the laminated positive electrode and negative electrode were spirally wound to form a spiral electrode body.

This spiral electrode body was inserted in a cell case having a cylinder form with a bottom, an outer diameter of 15 mm and a height of 40 mm. After spot welding lead wires for the positive and negative electrodes, a solution of 0.5 mole/l of NFB/EC:trimethyl phosphate (volume ratio of 1:2), which was bubbled by carbon dioxide as above for 10 minutes (dissolved amount of carbon dioxide being 0.1 mole/l) as an electrolytic solution was filled in the cell case. During the filling of the electrolytic solution, the cell case and the electrolytic solution were cooled at a temperature of −20° to −40° C., and the surrounding atmosphere was a dry atmosphere of carbon dioxide. Thereafter, the opening of the cell case was sealed to obtain a cylindrical organic electrolytic solution secondary cell having the structure shown in FIG. 1.

Example 6

In the same manner as in Example 5 except that the time for forming the short circuit between the band-form electrode made from the precursor of the negative electrode active material and the counter electrode of Li in the carbon treatment solution was changed to 3 hours, a band-form negative electrode was produced. Then, using this band-form negative electrode, a cylindrical organic electrolytic solution secondary cell was produced in the same manner as in Example 5.

A retention was evaluated using a model cell comprising this negative electrode and a solution of 0.5 mole/l of NFB/EC:trimethyl phosphate (volume ratio of 1:2), which was bubbled by carbon dioxide as above for 10 minutes (dissolved amount of carbon dioxide being 0.1 mole/l) as an electrolytic solution in the same way as in Example 5. In the first cycle, the retention of the negative electrode was 3%.

Example 7

In the same manner as in Example 5 except that carbon dioxide was not bubbled through the carbon treatment solution when the short circuit was formed between the band-form electrode made from the precursor of the negative electrode active material and the counter electrode of Li in the carbon treatment solution, a band-form negative electrode was produced. Then, using this band-form negative electrode, a cylindrical organic electrolytic solution secondary cell was produced in the same manner as in Example 5.

A retention was evaluated using a model cell comprising this negative electrode and a solution of 0.5 mole/l of NFB/EC:trimethyl phosphate (volume ratio of 1:2), which was bubbled by carbon dioxide as above for 10 minutes (dissolved amount of carbon dioxide being 0.1 mole/l) as an electrolytic solution in the same way as in Example 5. In the first cycle, the retention of the negative electrode was 4%.

Example 8

In the same manner as in Example 5 except that the untreated negative electrode was used instead of the negative electrode which was treated by the carbon treatment solution, a cylindrical organic electrolytic solution secondary cell was produced.

A retention was evaluated using a model cell comprising the untreated negative electrode and a solution of 0.5 mole/l of NFB/EC:trimethyl phosphate (volume ratio of 1:2), which was bubbled by carbon dioxide as above for 10 minutes (dissolved amount of carbon dioxide being 0.1 mole/l) as an electrolytic solution in the same way as in Example 5. The retention of the negative electrode was 21% in the first cycle, and 4% in the third cycle.

Each of the organic electrolytic solution secondary cells of Examples 5–8 was charged and discharged between 2.7 V and 4.2 V at 0.1 C, and a retention in the first cycle was measured. The results are shown in Table 2. The retention was calculated according to the following equation:

Retention (%)=[(charge capacity−discharge capacity)/charge capacity]×100

For reference, Table 2 also contains the $I_{285}/I_c$ ratios in the above Examples, which were measured in the same manner as above. Further, Table 2 contains the $I_{135}/I_c$ ratio of the carbonaceous material of the negative electrode in each Examples, which is obtained by carrying out the XPS analysis on the surface of the negative electrode and calculating a ratio of a peak intensity of phosphorus around 135 eV ($I_{135}$) to a sum of peak intensities of carbon from around 284 eV to around 289 eV ($I_c$) ($I_{135}/I_c$). Further, the $I_{135}/I_c$ was measured in the inside part of the electrode after etching the electrode by argon ion sputtering at 2 KeV, 7–8 μm for 10 minutes. The results are also shown in Table 2.

TABLE 2

| Ex. No. | Retention (%) | $I_{285}/I_c$ | $I_{135}/I_c$ Surface | $I_{135}/I_c$ Inside |
|---|---|---|---|---|
| Ex. 5 | 8 | 0.06 | 0.25 | 0.16 |
| Ex. 6 | 9 | 0.3 | 0.17 | 0.1 |
| Ex. 7 | 12 | 0.3 | 0.17 | 0.1 |
| Ex. 8 | 30 | 0.9 | 0.03 | 0.03 |

As seen from the results in Table 2, the organic electrolytic solution secondary cells of Examples 5–7 which had the high $I_{135}/I_c$ ratios on the surface of the carbonaceous material of the negative electrode had the smaller retention and then the better properties as the secondary cell than the cell of Example 8.

Example 9

Trimethyl phosphate and EC were mixed in a volume ratio of 98:2. In this mixed solvent, NFB was dissolved in a concentration of 1.0 mole/l to obtain an organic electrolytic solution. Through the solution, carbon dioxide was bubbled to dissolve carbon dioxide in the solution at a partial pressure of 1 kgf/cm².

Separately, flake graphite (6 wt. parts) as a conducting aid was added and mixed in LiNiO₂ (91 wt. parts). This mixture and a solution of polyvinylidene fluoride (3 wt. parts) dissolved in N-methylpyrrolidone were mixed to obtain a slurry. This slurry of the positive electrode mixture was passed through a net of 70 mesh to remove coarse particles, and then coated uniformly on both surfaces of a positive electrode current collector made of an aluminum foil having a thickness of 20 μm and dried. Then, it was press molded by a roller press, and cut. To the current collector, a lead member was welded to obtain a band-form positive electrode.

In the separate steps, carbon having $d_{002}$ of 3.37 Å, Lc of 290 Å, an average particle size of 10 μm and a purity of 99% (90 wt. parts) and a solution of polyvinylidene fluoride (10 wt. parts) dissolved in N-methylpyrrolidone were mixed to obtain a slurry. This slurry of the negative electrode mixture was passed through a net of 70 mesh to remove coarse particles, and then coated uniformly on both surfaces of a negative electrode current collector made of a band-form copper foil having a thickness of 18 μm and dried. Then, it was press molded by a roller press, and cut. To the current collector, a lead member was welded to obtain a band-form negative electrode.

Then, the above produced band-form positive electrode was laminated on the above produced band-form negative electrode with interposing a microporous polypropylene film having a thickness of 25 μm therebetween, and the laminated positive electrode and negative electrode were spirally wound to form a spiral electrode body, which was inserted in a cell case having a cylinder form with a bottom and an outer diameter of 15 mm. Lead wires for the positive and negative electrodes were welded.

The cell case including the spiral electrode body, and the above organic electrolytic solution in which carbon dioxide was dissolved were cooled by dry ice to −20° to −40° C. While maintaining the carbon dioxide atmosphere, the organic electrolytic solution was filled in the cell case. After the separator and so on were well impregnated by the organic electrolytic solution, about 0.02 gram of dry ice was put in the cell case without wetting the dry ice by the electrolytic solution. After 5 seconds, the cell opening was sealed to obtain the cylindrical organic electrolytic solution secondary cell having the structure shown in FIG. 1. A content of carbon dioxide in the cell which was produced in the same way as above was measured to find that the carbon dioxide content was about 0.35 mole/l per unit volume of the electrolytic solution.

Example 10

In trimethyl phosphate, 1.0 mole/l of NFB was dissolved to prepare organic electrolytic solution. Through this solution, carbon dioxide was bubbled to dissolve carbon dioxide therein. In the same manner as in Example 9 except that this organic electrolytic solution was used, a cylindrical organic electrolytic solution secondary cell was produced. A content of carbon dioxide in the cell was the same as that in Example 9.

Example 11

In the same manner as in Example 9 except that, as a carbonaceous material, carbon having $d_{002}$ of 3.42 Å, Lc of 32 Å, an average particle size of 12 μm and a purity of 99% was used, a cylindrical organic electrolytic solution secondary cell was produced. A content of carbon dioxide in the cell was the same as that in Example 9.

Example 12

In the same manner as in Example 9 except that a dissolved amount of carbon dioxide in the organic electrolytic solution was changed to 0.1 mole/l, a cylindrical organic electrolytic solution secondary cell was produced. In this Example, no piece of dry ice was charged in the cell, when the electrolytic solution was filled in the cell case.

Example 13

Triethyl phosphate and EC were mixed in a volume ratio of 98:2. In this mixed solvent, 1.0 mole/l of NFB was dissolved to prepare an organic electrolytic solution. In this solution, carbon dioxide was bubbled to dissolve carbon dioxide therein. In the same manner as in Example 9 except that this organic electrolytic solution was used, a cylindrical organic electrolytic solution secondary cell was produced. A content of carbon dioxide in the cell was the same as that in Example 9.

Each of the organic electrolytic solution secondary cells of Examples 9–13 was charged and discharged between 2.7 V and 4.1 V at 35 mA, and a discharge capacity in the first cycle was measured. The results are shown in Table 3.

TABLE 3

| Ex. No. | Discharge capacity (mAh) |
| --- | --- |
| Ex. 9 | 350 |
| Ex. 10 | 210 |
| Ex. 11 | 280 |
| Ex. 12 | 310 |
| Ex. 13 | 290 |

As seen from the results in Table 3, the organic electrolytic solution secondary cells of Examples 9–13 in which carbon dioxide was dissolved in the organic electrolytic solution achieved the high discharge capacity, which means that the dissolution of carbon dioxide achieves the increase of capacity.

To check the safety from fire of each of the organic electrolytic solution secondary cells of Examples 9–13, the following safety test was carried out, using, as a comparison, the organic electrolytic solution secondary cell of Comparative Example which used the conventional organic solvent other than the trialkyl phosphate.

Comparative Example 2

1,2-Dimethoxyethane and EC were mixed in a volume ratio of 1:1. In this mixed solvent, 1.0 mole/l of NFB was dissolved to prepare an organic electrolytic solution. In the same manner as in Example 9 except that this organic electrolytic solution was used without dissolving carbon dioxide therein, a cylindrical organic electrolytic solution secondary cell was produced.

Safety Test

To simulate a condition that, in a cell in a state that a safety valve functions when the cell is heated to a high temperature, that is, in the cell shown in FIG. 1, a gas is generated by the evaporation of the solvent from the electrolytic solution and an internal pressure of the cell increases so that the flexible thin plate 10 is inflated towards the terminal plate 12 end contacted to the cutting edge 12a, whereby the flexible thin plate 10 is broken to exhaust the gas through the gas vent hole 12b, the flexible thin plate 10 was beforehand broken, and the cell in such condition was heated up to 100° C. Then, a fire was accessed to the gas vent hole 12b, and whether or not the cell was ignited was observed.

TABLE 4

| Ex. No. | Safety test |
| --- | --- |
| Ex. 9 | Not ignited |
| Ex. 10 | Not ignited |
| Ex. 11 | Not ignited |
| Ex. 12 | Not ignited |
| Ex. 13 | Not ignited |
| C. Ex. 2 | Ignited when heated to ca. 40° C. |

As seen from the results in Table 4, the cell of Comparative Example 2 which used the conventional organic solvents as the solvents of the organic electrolytic solution was ignited when the cell was heated to about 40° C. and burnt, while all the cells of Examples 9–13 which used the trialkyl phosphate as the main solvent were not ignited even when the cells were heated to 100° C., and had the high safety from the fire. In particular, a flash point of each of the electrolytic solutions in the cells of Examples 1–4 was higher than 200° C.

EFFECTS OF THE INVENTION

In the present invention, the ester of phosphoric acid is used as the main solvent of the organic electrolytic solution, and the carbonaceous material is used as the negative electrode. In addition, the surface of the carbonaceous material of the negative electrode is changed to the specific conditions, and carbon dioxide is dissolved in the organic electrolytic solution. Thereby, the organic electrolytic solution secondary cell, which is excellent in safety and shelf stability, and also the cell properties such as the closed circuit voltage, the retention (difference between the charge capacity and the discharge capacity), the discharge capacity and so on, can be provided.

What is claimed is:

1. An organic electrolytic solution secondary cell comprising a positive electrode, a negative electrode and an organic electrolytic solution, wherein a solvent of said organic electrolytic solution contains a triester of phosphoric acid, and said negative electrode comprises a carbonaceous material, and wherein the ratio ($I_{135}/I_c$) of peak intensity of phosphorus around 135 eV ($I_{135}$) to a sum of peak intensities of carbon from around 284 eV to around 289 eV ($I_c$) in an X-ray photoelectron spectroscopy on a surface of the negative electrode is at least 0.05.

2. The organic electrolytic solution secondary cell according to claim 1, wherein said triester of phosphoric acid is a trialkyl phosphate of the formula:

$$(RO)_3P=O$$

wherein the three R groups are the same or different and represent an alkyl group having 1 to 6 carbon atom.

3. The organic electrolytic solution secondary cell according to claim 1, wherein a ratio of a peak intensity of carbon around 285 eV ($I_{285}$) to a sum of peak intensities of carbon from around 284 eV to around 289 eV ($I_c$) ($I_{285}/I_c$) in an X-ray photoelectron spectroscopy on a surface of the negative electrode is not larger than 1.0.

4. The organic electrolytic solution secondary cell according to any one of claims 1 to 3, wherein said solvent of the organic electrolytic solution contains an ester having a dielectric constant of at least 30.

5. The organic electrolytic solution secondary cell according to claim 4, wherein said ester having the dielectric constant of at least 30 is an alkylene carbonate having 2 to 6 carbon atoms.

6. The organic electrolytic solution secondary cell according to claim 1, wherein said ratio on the surface is larger than a $I_{135}/I_c$ ratio of the inside of the negative electrode.

7. The organic electrolytic solution secondary cell according to any one of claims 1 to 4, wherein carbon dioxide is dissolved in said organic electrolytic solution.

8. The organic electrolytic solution secondary cell according to claim 7, wherein a dissolved amount of carbon dioxide is at least 0.03 mole/l.

9. The organic electrolytic solution secondary cell according to claim 7 or 8, wherein said solvent of the organic electrolytic solution contains 1 to 10 vol. % of said ester having the dielectric constant of at least 30.

* * * * *